Patented Oct. 28, 1924.

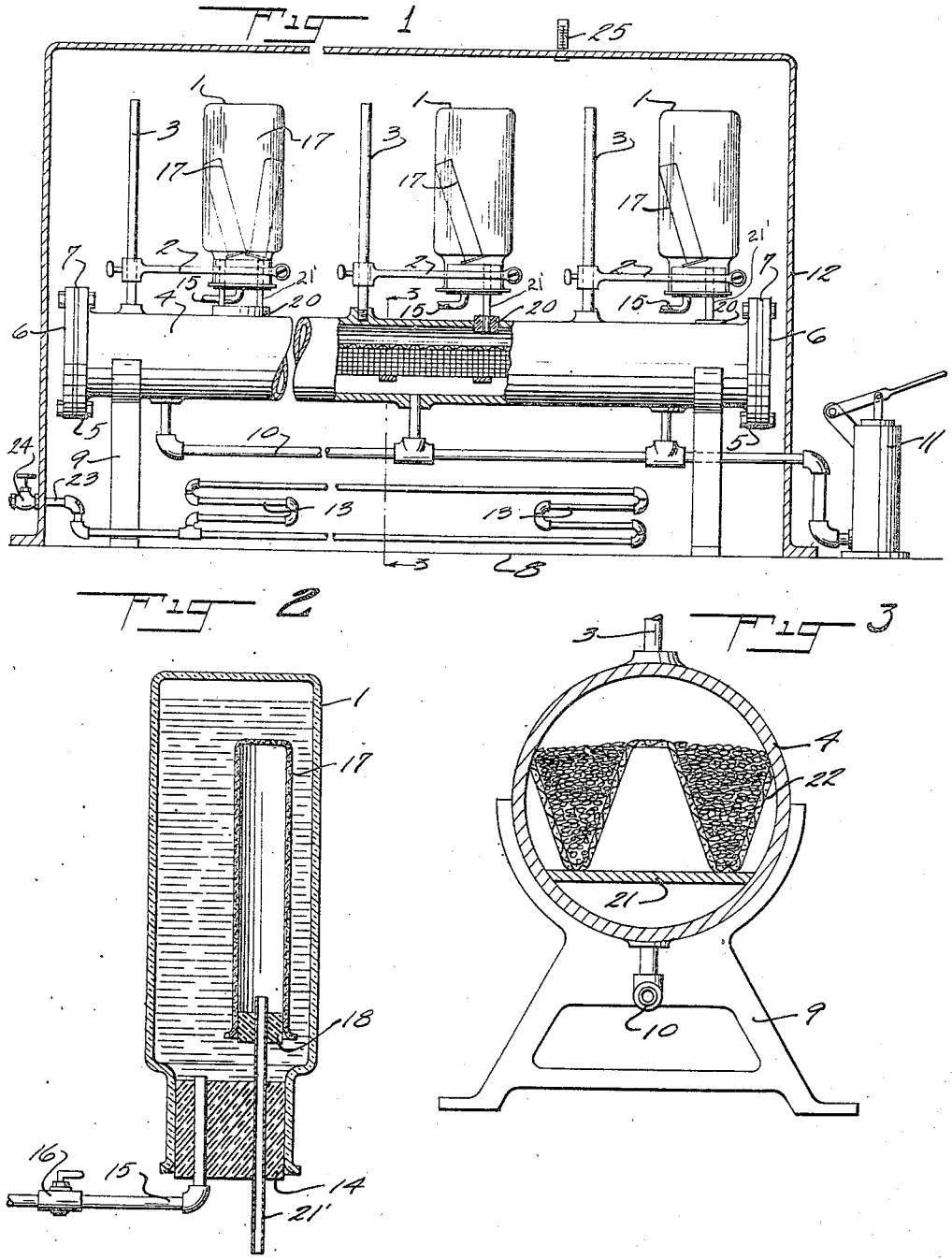

1,512,909

UNITED STATES PATENT OFFICE.

PAUL GEORGE DOHR, OF YONKERS, NEW YORK, ASSIGNOR TO KOBER CHEMICAL COMPANY, INC., OF HASTINGS-ON-HUDSON, NEW YORK, A CORPORATION OF NEW YORK.

PROCESS AND APPARATUS FOR SEPARATION OF SOLIDS FROM LIQUIDS CONTAINING THE SAME.

Application filed July 11, 1921. Serial No. 483,824.

*To all whom it may concern:*

Be it known that I, PAUL GEORGE DOHR, a citizen of the United States, and resident of Yonkers, in the county of Westchester and State of New York, have invented certain new and useful Improvements in Processes and Apparatus for Separation of Solids from Liquids Containing the Same, of which the following is a specification.

This invention relates to a process and apparatus for the separation of solids from liquids containing the same, and has particular reference to a process and apparatus for drying hydrochlorid of 3, 3-diamino-4, 4-dioxyarsenobenzol and like products from aqueous solutions of hydrochloric acid from which such products have been precipitated.

It is well known that Ehrlich and his collaborators (Berichte der deutschen chemische Gesellschaft, 45,756, 1912) made a hydrochlorid of 3, 3-diamino-4, 4-dioxyarsenobenzol and called it salvarsan. Their product contained a molecule of methyl alcohol as Kober pointed out in the Journal of Amer. Chem. Soc. Vol. XLI, page 442, (1919) and it was precipitated from methyl alcohol and ether. The drying required the removal of methyl alcohol and ether while preventing access of air. These solvents being very volatile it was not difficult to dry the product in large desiccators, even though the desiccators of glass were very expensive and dangerous to handle.

A methyl alcohol free salvarsan preparation may be obtained according to German Patents #271,894 and #206,456 and also according to Kober's article above cited. Essentially both processes are the same. Both depend upon the salting effect of hydrochloric acid upon chlorides, and precipitate the hydrochlorid of 3, 3-diamino-4, 4-dioxyarsenobenzol. The products obtained from either process are identical.

It is necessary to separate the hydrochlorid obtained by either of these processes from the water and hydrochloric acid in which it has been precipitated, so that a dry acid free product may be available for medicinal use. Access of air must be prevented during the separating and drying, to insure sterility of the product.

It is highly impracticable to attempt to dry the hydrochlorid in glass desiccators, as was done with Ehrlich's product, because an aqueous solution of hydrochloric acid is very much less volatile than the mixture of methyl alcohol and ether.

I have found that dry acid free hydrochlorid may be obtained by first filtering the precipitate and then by evaporating therefrom under a vacuum the remaining traces of aqueous solution of hydrochloric acid. The process is conducted in closed containers, preferably glass bottles, which are sealed from the atmosphere. The filters are preferably of alundum or similar acid resisting material, conical or cylindrical in shape and hollow. The filtering operation is effected by connecting the interior of the filter, through the stopper of the container, with a suitable means for exhausting the filtrate therethrough, as in ordinary vacuum filtration. The precipitate collects on the outside of the filter, and may be washed with hydrochloric acid with or without the aid of alcoholic hydrochloric acid and ether. After the removal of as much of the liquid as can be accomplished by filtration, the tubing is removed from the filter, and the interior of the container is connected to a vacuum chamber containing absorbents for the vapors of water and hydrochloric acid. Air and vapor are exhausted from the vacuum chamber by pumps of ordinary design. The bottles are preferably maintained in inverted position during the operation so that any unvaporized liquid in the filter may drain out into the vacuum chamber. Heat is supplied to expedite the process by enclosing the bottles and generally the vacuum chamber also, in a heating chamber, the temperature of which is subject to control.

With these and other objects in view, I have devised the method and apparatus embodying my invention, described in the following specification and illustrated in the accompanying drawings, of which—

Figure 1 is a longitudinal elevation partly in section of the assembled apparatus, Figure 2 is a vertical section of one of the containers with filter, and Figure 3 is a transverse section of the vacuum chamber, taken on the line 3—3 of Figure 2.

Referring to the drawing 1 denotes the filtering and evaporating container, preferably a wide mouth glass bottle of about one-half gallon capacity, and closed by stopper 14, preferably of rubber or other suitable material resistant to the action of the filtrate. Within container 1 is a hollow non-collapsible filter 17, preferably of cylindrical or conical shape, and composed of alundum, or other suitable acid-proof porous stone-wear of sufficient hardness to withstand removal of the precipitate. Filter 17 is closed by a stopper 18, preferably of the same material as stopper 14. A tube 21', which may be of glass, connects the interior of filter 17 with an ordinary suction device (not shown) used in vacuum filtration, tube 21' passing through stoppers 14 and 18. A tube 15, having valve 16, passes through stopper 14 and is used to introduce the solution to be filtered into container 1. Tube 15 may also be used to admit an inert gas to container 1 during filtering, to prevent a vacuum therein. As the filtrate is thus withdrawn, the precipitate accumulates upon the exterior of filter 17. When the process of filtration has been carried as far as practicable in this manner, tube 21' is withdrawn from stopper 18, and the opposite end is connected to my improved drying apparatus presently to be described. The interior of filter 17 is now in free communication with the interior of container 1, while the latter is connected through tube 21' to the dryer.

A clamp 2 on rod 3 supports bottle 1 in inverted position over evaporating chamber 4, into which rod 3 is threaded. Chamber 4 is preferably a length of 5 or 6 inch diameter pipe, of cast iron, steel or other suitable metal. Both ends of pipe 4 are flanged as at 5 to permit bolting on of heads 6, rubber gaskets 7 being interposed between flanges 5 and heads 6 to seal the ends of the pipe. Pipe 4 is supported upon table 8 by supports 9. A vacuum line 10 connects pipe 4 at various points to a vacuum pump 11. In practice it is desirable to employ a large capacity pump for exhausting the evaporating chamber and vacuum line during the early stages of the operation, and a smaller capacity pump for maintaining the vacuum during the later stages, the larger pump being disconnected. These pumps, especially the smaller, must be capable of giving a very high degree vacuum. They do not of themselves form any part of the invention, but only in combination, and only one pump is shown on the drawing.

Pipe 4, together with containers 1 is enclosed in a heating chamber 12 resting upon or secured to table 8. Chamber 12 should be heat insulated, or composed of non-conducting material. Heat is supplied by steam coils 13 within chamber 12, or by other suitable means. Chamber 12 is slotted at one end to permit vacuum pipe 10 to pass therethrough, pump 11 being positioned outside. A valve 24 in steam pipe 23 leading to coils 13 permits regulation of the temperature within chamber 12, the temperature being indicated by thermometer 25.

Supported within pipe 4 by cross pieces 21, or by blocks if desired, is an elongated wire mesh basket 22 of W shape cross section containing flake caustic soda in one of the pockets and fused or dehydrated calcium chlorid in the other. If more convenient, stick or lump caustic soda may be employed instead of flakes. Basket 22, together with attached supports 21 is introduced into pipe 4 by removing one of heads 6, and the supply of castic soda and calcium chlorid is thus replenished from time to time between drying operations.

It is ordinarily most convenient to work about twelve containers at a time, for which number a seven to eight foot length of pipe 4 is most suitable. For quantity production a longer pipe and more containers may be employed. The process may be expedited by placing more than one filter in each container, as shown in Figure 1, thus increasing the filtering surface more in proportion than would be done by merely enlarging the filter. Raising the temperature within chamber 12 will greatly accelerate the rate of evaporation. For salvarsan preparations, the temperature should be maintained within the limits of 35° to 50° centigrade.

From the foregoing the operation of the device will be apparent. The wet precipitate is first collected upon the exterior of filter 17, the filtrate being removed in the usual manner. Container 1 then being connected to vacuum chamber 4 through tube 21', any liquid accumulated in container 1 or in filter 17 will drain out and be absorbed by the calcium chlorid and the caustic soda in chamber 4. As the vapors of water and of hydrochloric acid are formed, they will be exhausted by pumps 11, and drying will proceed from both sides of the layer of precipitate deposited on filter 17, the latter permitting the passage of vapor through its walls. The heat furnished by coils 13 will restore the heat lost by evaporation, and thus maintain the proper temperature for the continuance of the operation. At this stage it is sometimes desirable, to accelerate drying, to admit through pipe 15 a dry sterilized inert gas. Whether or not this latter step is practiced, it is evident that the conditions under which the product is obtained are strictly anaerobic.

The above described process and apparatus may be advantageously employed in the preparation of neoarsphenamine, sodium arsphenamine, or derivatives of the same, or other substances injuriously affected by air, as well as in the preparation of hydrochlorid of 3, 3-diamino-4, 4-dioxyarsenobenzol above disclosed, as the conditions are strictly anaerobic, that is, air is positively excluded during all stages.

What I claim is:

1. An apparatus for the anaerobic drying of a wet precipitate, comprising a closed container, a filter within said container for holding the precipitate on its surface, means for supplying heat to said container and means for exhausting vapor from said container.

2. An apparatus for the anaerobic drying of a wet precipitate, comprising a closed container, a filter within said container for holding the precipitate on its surface, means for admitting a dry inert gas and for supplying heat to said container, and means for exhausting gas and vapor from said container.

3. An apparatus for the anaerobic drying of a wet precipitate, comprising a closed container, means for holding the precipitate within said container, a closed chamber below said container and containing absorbents for the fluid in the container, and a connection between said chamber and the lower portion of said container.

4. An apparatus for the anaerobic drying of a wet precipitate, comprising a closed container, means for holding the precipitate within said container, a closed chamber below said container and containing absorbents for the fluid in the container, means for exhausting air and vapor from said chamber, and a connection between said chamber and the lower portion of said container.

5. An apparatus for the anaerobic drying of of a wet precipitate, comprising a closed container, porous means within said container for holding the precipitate in a layer while permitting drying from either side thereof, means for draining liquid from said container, and means for removing by evaporation from said container the undrained liquid therein.

6. An apparatus for the anaerobic drying of a wet precipitate, comprising an inverted vessel, a stopper closing the mouth of said vessel, porous means within said vessel for holding the precipitate in a layer, a vacuum chamber, a connection between said vacuum chamber and the interior of said vessel, and absorbent material in said chamber for the liquid on the precipitate, said vessel and connection being so disposed as to permit gravity drainage into the chamber of unvaporized liquids within the vessel, as well as the vacuum induced passage of vapor to said chamber.

7. An aparatus for the anaerobic separation of precipitates from liquids containing the same, comprising a heating chamber, means for supplying heat thereto, a closed container in said heating chamber, means for draining from said container unvaporized liquid while retaining the precipitate and means for exhausting from said container the vapors formed therein.

8. An apparatus for anaerobically drying the hydrochlorid of 3, 3-diamino-4, 4-dioxy-arsenobenzol and like products from aqueous solutions of hydrochloric acid from which the products have been precipitated, comprising a closed container, a hollow closed non-collapsible filter of acid resisting material within said container, a closed chamber containing caustic soda and dehydrated calcium chlorid, means for maintaining a vacuum within said chamber, means for withdrawing from said container through said filter the greater portion of the liquid in said container, and means for connecting said container to said chamber after the completion of said filtration, so as to permit drainage and evaporation from the container to the chamber.

9. An apparatus for anaerobically drying the hydrochlorid of 3, 3-diamino-4, 4-dioxy-arsenobenzol and like products from aqueous solutions of hydrochloric acid from which the products have been precipated, comprising a closed container, a hollow closed non-collapsible filter of acid resisting material within said container, a closed chamber containing caustic soda and dehydrated calcium chlorid, means for maintaining a vacuum within said chamber, means for withdrawing from said container through said filter the greater portion of the liquid in said container, means for connecting said container to said chamber after the completion of said filtration so as to permit drainage and evaporation from the container to the chamber, and means for applying heat to the container during such evaporation.

10. The method of anaerobically drying the hydrochlorid of 3, 3-diamino-4, 4-dioxy-arsenobenzol and like products from aqueous solutions of hydrochloric acid from which the products have been precipitated, which consists in placing the wet precipitate within a sealed container and in exhausting the vapors from said container while maintaining the contents at a temperature of from 35° to 50° centigrade until the product is dry and free from hydrochloric acid.

Signed at Yonkers in the county of Westchester and State of New York, this day of July A. D. 1921.

PAUL GEORGE DOHR.